Figures 1, 2:
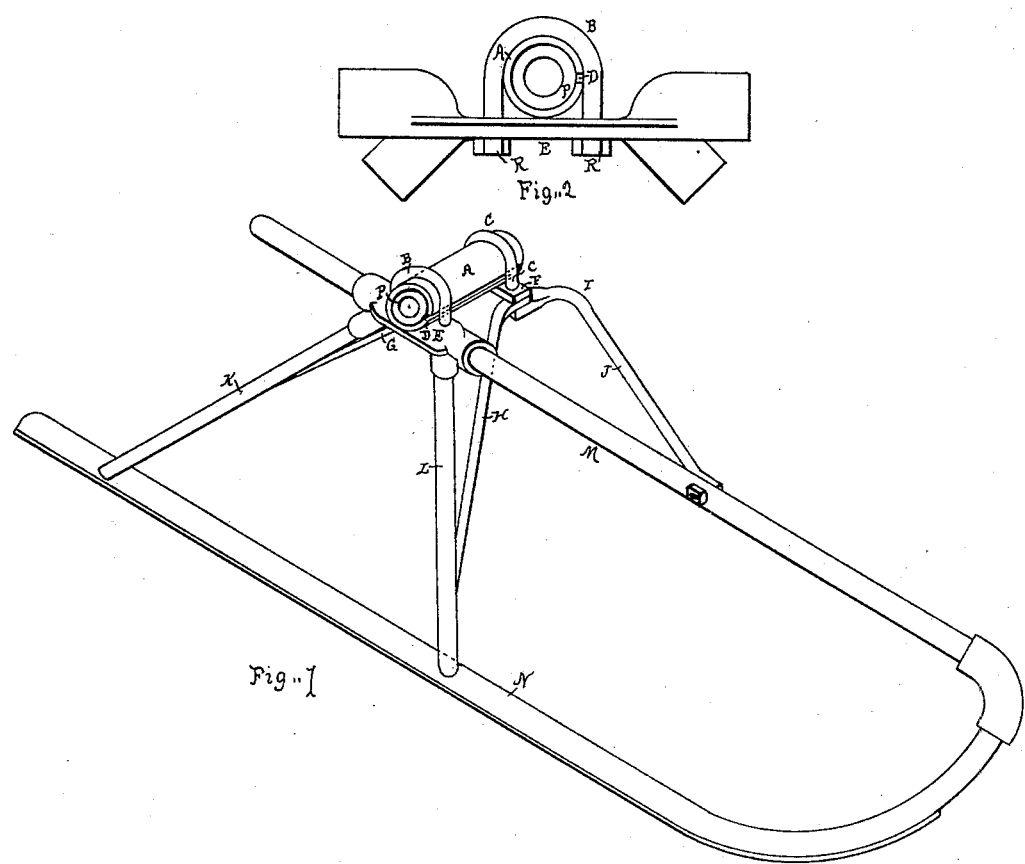

(No Model.)

R. E. LEE.
RUNNER FOR WHEELED VEHICLES.

No. 391,626. Patented Oct. 23, 1888.

Witnesses

Inventor,
Robert E. Lee,
by Geo. H. Lothrop,
atty.

United States Patent Office.

ROBERT E. LEE, OF ALMONT, MICHIGAN, ASSIGNOR OF TWO-THIRDS TO JAMES S. JOHNSON, OF SAME PLACE.

RUNNER FOR WHEELED VEHICLES.

SPECIFICATION forming part of Letters Patent No. 391,626, dated October 23, 1888.

Application filed July 21, 1888. Serial No. 280,590. (No model.)

*To all whom it may concern:*

Be it known that I, ROBERT E. LEE, of Almont, in the county of Lapeer and State of Michigan, have invented a new and useful Improvement in Sleigh-Runners for Wheeled Vehicles, of which the following is a specification.

My invention consists in an improvement in sleigh-runners for wheeled vehicles, hereinafter fully described and claimed.

Figure 1 is a perspective of the runner complete, and Fig. 2 is a side elevation of the hub.

I have shown my improvement as attached to a runner made of pipe; but it is of course applicable to any construction of runner. It is very often desirable in winter to remove the wheels of a wheeled vehicle and substitute in their place runners; and my invention consists in a runner for this purpose N represents the shoe, M the top bar, and K and L the knees of the runner, the knees and top bar being screwed into the plate A.

My improved hub consists in a sleeve, A, preferably of metal, which has a slot its whole length, as shown at D. This sleeve is secured to the upper bar of the runner by two threaded staples, D and C, which embrace the sleeve A, pass through the upper bar of the runner, and are secured thereto by nuts R R. When the runner is made of pipe and the upper bar or plate, E, is narrow, the staple C may be secured to a plate, F, which is carried on two places, G and H, projecting upward and outward from the knees K and L; but when the upper bar of the runner is broad enough the two staples B and C may both run through the bar.

E represents a wooden thimble with a hole therethrough to receive the axle of the vehicle, and when the nuts R R are slacked off, the thimble P may be pushed into or out from the sleeve A. The object of this is to permit the runner to be used on axles of different diameters, it being only necessary to substitute a wooden thimble, P, with a bore of the proper size to fit the axle. If the bore through the thimble is too small for this axle on which it is to be used, and no thimble with bore of proper size is at hand, the bore in the thimble at hand may be enlarged to fit the axle by any carpenter or by any person accustomed to the use of tools. When the thimble P is inserted in the sleeve A, the nuts R R are tightened, and this compresses the sleeve A, so that it binds the thimble P firmly in position.

J represents a guard-rail secured to the outer side of the upper bar of the runner and running backward and outward, so that its extreme projection I is beyond the end of the sleeve A, and its rear end is bent inward and fastened to the sleeve or to the part which supports the sleeve. With this guard-rail the sleeve A cannot run into an obstruction, as anything which clears the nose of the runner will strike the guard-rail J and crowd the runner to one side, avoiding breaking or springing the axle of the vehicle.

What I claim as my invention, and desire to secure by Letters Patent, is—

1. In a sleigh-runner, a hub consisting of a compressible metal sleeve, a wooden thimble, and means for clamping the sleeve to the runner and compressing it, substantially as shown and described.

2. In a sleigh-runner, a hub consisting of the sleeve A, having the slot D therein, the removable thimble P, and the screw-threaded staples B and C, substantially as shown and described.

ROBERT E. LEE.

Witnesses:
F. P. ANDRUS,
R. E. LIPPINCOTT.